(12) United States Patent
Kim et al.

(10) Patent No.: US 11,055,876 B2
(45) Date of Patent: Jul. 6, 2021

(54) METHOD OF DETERMINING INFORMATION ABOUT IMAGING POSITION AND APPARATUS FOR PERFORMING THE SAME

(71) Applicant: LINKFLOW CO., LTD, Seoul (KR)

(72) Inventors: Yongkuk Kim, Suwon-si (KR); Sungrae Cho, Seoul (KR); Yongjin Kim, Busan (KR); Junse Kim, Gwangju-si (KR)

(73) Assignee: LINKFLOW CO., LTD, Seoul (KR)

( * ) Notice: Subject to any disclaimer, the term of this patent is extended or adjusted under 35 U.S.C. 154(b) by 0 days.

(21) Appl. No.: 16/607,157

(22) PCT Filed: Jun. 19, 2017

(86) PCT No.: PCT/KR2017/006422
§ 371 (c)(1),
(2) Date: Oct. 22, 2019

(87) PCT Pub. No.: WO2018/216844
PCT Pub. Date: Nov. 29, 2018

(65) Prior Publication Data
US 2020/0388049 A1 Dec. 10, 2020

(30) Foreign Application Priority Data
May 23, 2017 (KR) .................. 10-2017-0063288

(51) Int. Cl.
*G06T 7/00* (2017.01)
*G06T 7/73* (2017.01)

(52) U.S. Cl.
CPC ...... *G06T 7/74* (2017.01); *G06T 2207/10016* (2013.01); *G06T 2207/30244* (2013.01)

(58) Field of Classification Search
None
See application file for complete search history.

(56) References Cited

U.S. PATENT DOCUMENTS

| 8,319,859 B2 | 11/2012 | Kim et al. |
| 9,443,263 B1 | 9/2016 | Kim |
| (Continued) | | |

FOREIGN PATENT DOCUMENTS

| CA | 2 822 946 A1 | 2/2015 |
| CN | 102054247 A | 5/2011 |
| (Continued) | | |

OTHER PUBLICATIONS

International Search Report dated Feb. 8, 2018 in corresponding International application No. PCT/KR2017/006422; 5 pages.
(Continued)

*Primary Examiner* — Delomia L Gilliard
(74) *Attorney, Agent, or Firm* — Maier & Maier, PLLC

(57) ABSTRACT

The present invention relates to a method for determining imaging location information and a device for performing same. A method for generating imaging position information may comprise the steps in which: a service server receives information on a plurality of frames from an image processing device; the service server determines each of a plurality of pieces of imaging location information on each of the plurality of frames; and the service server generates an image to be provided to user by post-processing the plurality of frames on the basis of the plurality of pieces of imaging location information.

14 Claims, 14 Drawing Sheets

(56) References Cited

U.S. PATENT DOCUMENTS

| | | | |
|---|---|---|---|
| 2006/0075442 A1 | | 4/2006 | Meadow |
| 2008/0306787 A1 | | 12/2008 | Hamilton et al. |
| 2012/0105682 A1 | * | 5/2012 | Hata .................. H04N 5/23293 |
| | | | 348/239 |
| 2018/0227487 A1 | * | 8/2018 | Heo ................... H04N 5/23254 |

FOREIGN PATENT DOCUMENTS

| | | | | |
|---|---|---|---|---|
| JP | 2003317193 | A | | 11/2003 |
| JP | 2012-099917 | A | | 5/2012 |
| KR | 2007-0109713 | A | | 11/2007 |
| KR | 10-2009-0132316 | A | | 12/2009 |
| KR | 20090132316 | A | * | 12/2009 |
| KR | 2010-0028399 | A | | 3/2010 |
| KR | 10-2011-0012514 | A | | 2/2011 |
| KR | 10-2015-0113246 | A | | 10/2015 |
| KR | 20150113246 | A | * | 10/2015 |
| KR | 101634966 | B1 | * | 3/2016 |
| KR | 10-1634966 | B1 | | 6/2016 |

OTHER PUBLICATIONS

Office Action dated Aug. 2, 2017 in corresponding Korean Application No. 10-2017-0063288; 7 pages including Partial Machine-generated English-language translation.

Written Opinion of the International Searching Authority dated Feb. 8, 2018 in corresponding International application No. PCT/KR2017/006422; 5 pages.

Office Action dated May 27, 2020 in Korean Office Action 10-2017-0164258; 9 pages including English-language translation.

Extended European Search Report dated Apr. 24, 2020, in connection with corresponding EP Application No. 17911007.7; 8 pages.

Chinese Office Action dated Sep. 1, 2020, in connection with corresponding CN Application No. 201780089643X (4 pp., including partial machine-generated English translation).

Japanese Office Action dated Dec. 15, 2020, in connection with corresponding JP Application No. 2019-557402 (8 pp., including machine-generated English translation).

* cited by examiner

FIG. 11
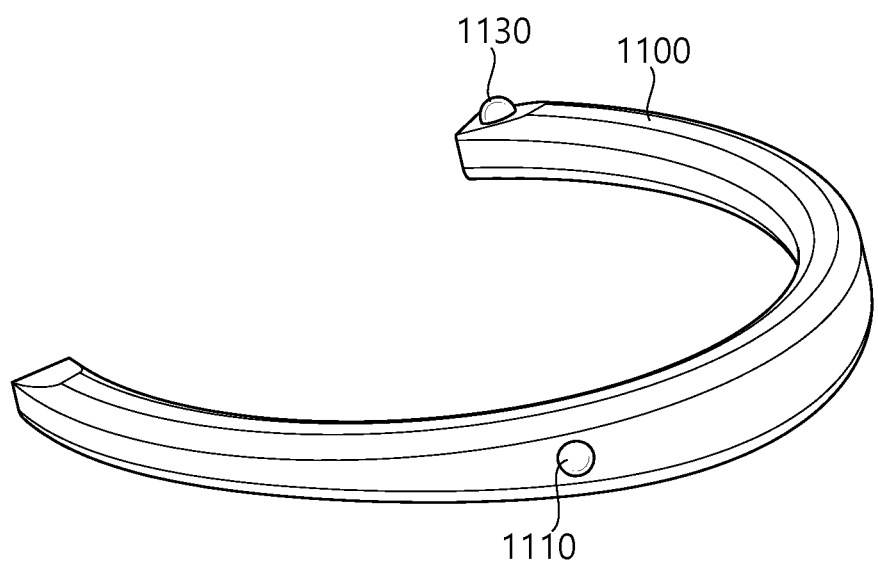
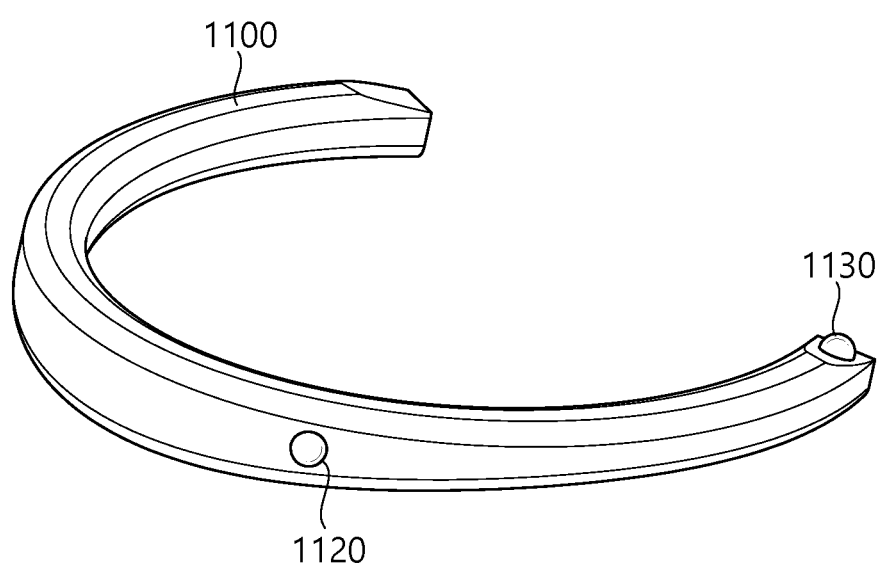

FIG. 13
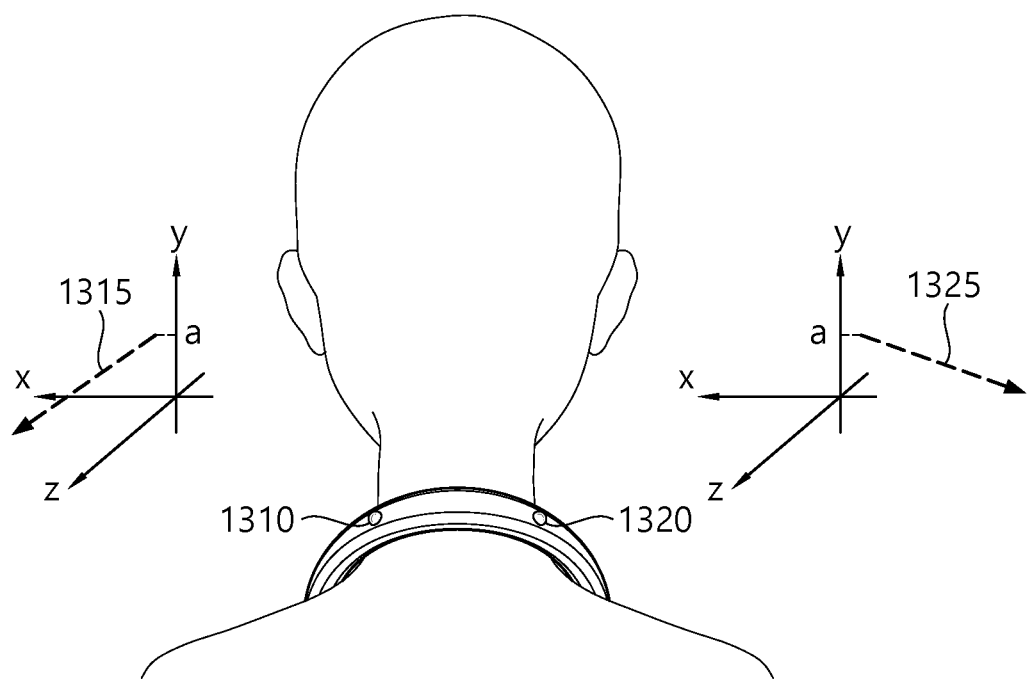
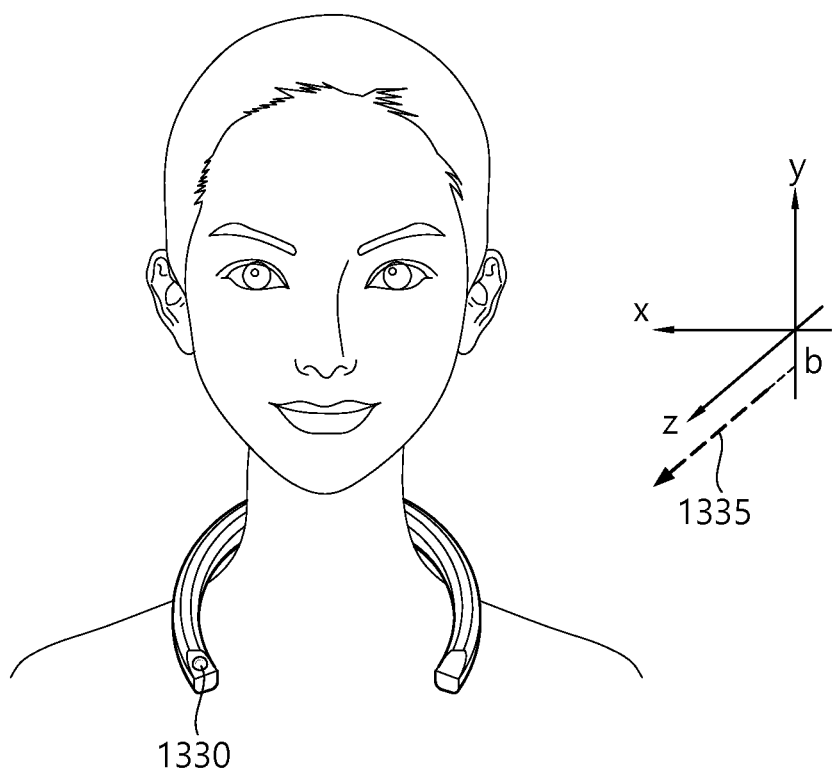

FIG. 14
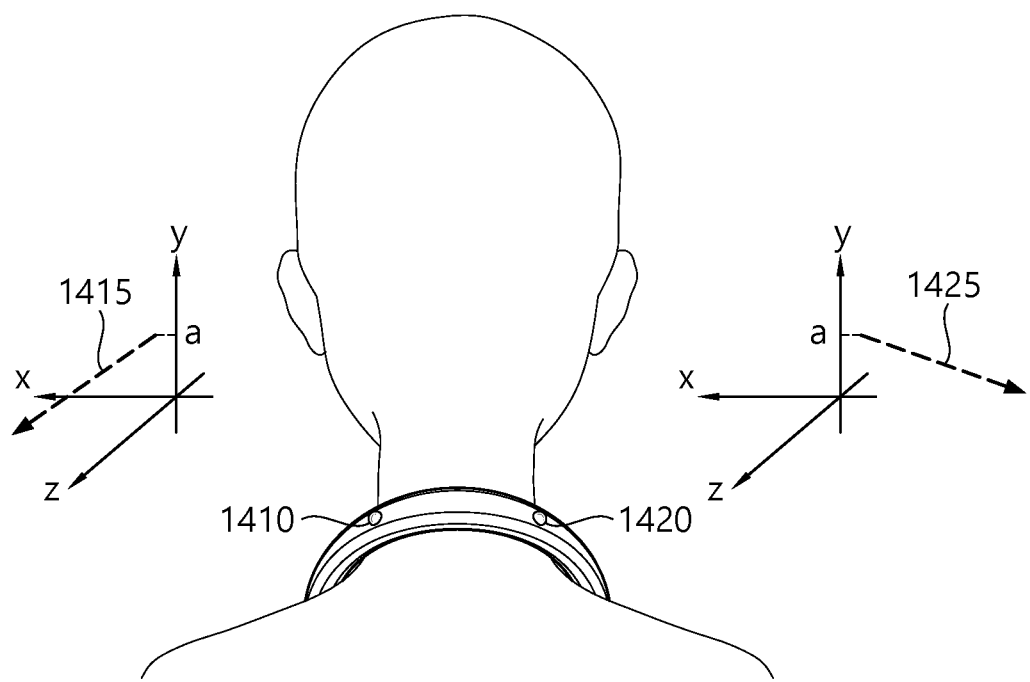
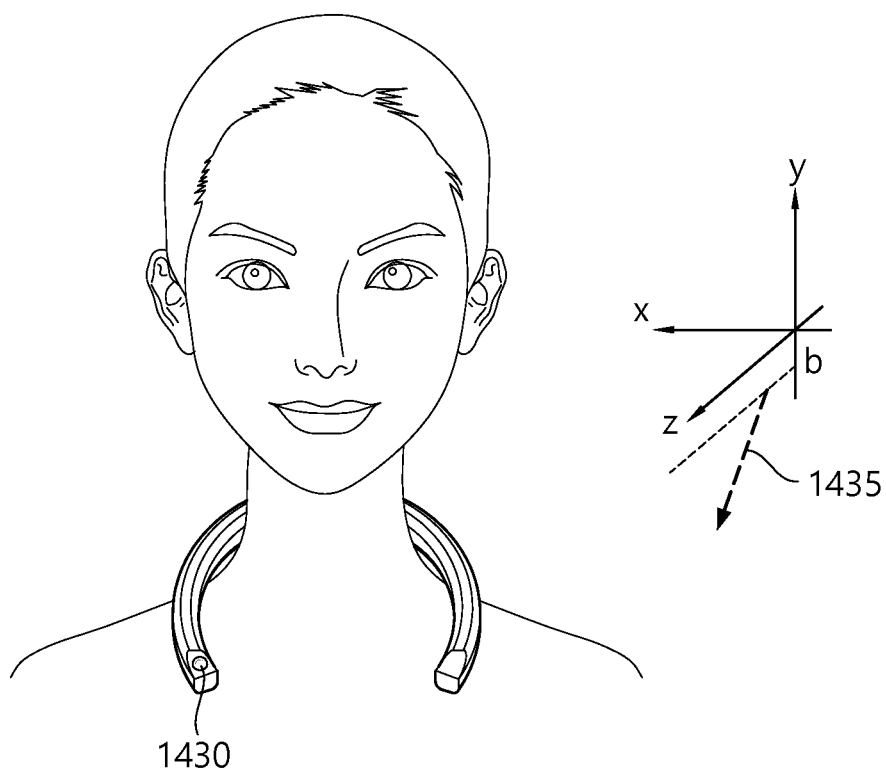

METHOD OF DETERMINING INFORMATION ABOUT IMAGING POSITION AND APPARATUS FOR PERFORMING THE SAME

CROSS-REFERENCE TO RELATED APPLICATIONS

This application claims priority to and the benefit of Korean Patent Application No. 2017-0063228, filed on May 23, 2017, the disclosure of which is incorporated herein by reference in its entirety.

FIELD

The present invention relates to a method of determining information about an imaging position and an apparatus for performing the same, and more specifically, to a method and device for determining imaging position information with respect to video information imaged by an image-processing device and performing post-processing to thereby provide a user with image content-based service.

BACKGROUND

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras, 360 degrees cameras) for obtaining an omnidirectional image.

Omnidirectional imaging devices may be utilized in various areas. For example, the omnidirectional imaging device may be used in an area requiring surveillance of omnidirectional images for crime prevention/security or may be used to record places visited by travelers during travel. In addition, an omnidirectional image imaged on the basis of the omnidirectional imaging device may be edited and used as an image for sale of a product.

Accordingly, there is a need to develop a technology for utilizing an omnidirectional image generated by a user on the basis of an omnidirectional image-processing device in various fields by performing various processes on the omnidirectional image.

SUMMARY OF THE INVENTION

The present invention provides a method of determining imaging position information and an apparatus performing the same that are capable of obviating the above described limitations.

In addition, the present invention provides a method of determining imaging position information and an apparatus performing the same that are capable of determining imaging position information of at least one frame among a plurality of frames included in video information (e.g., omnidirectional image information) generated by an image-processing device.

In addition, the present invention provides a method of determining imaging position information and an apparatus performing the same that are capable of generating a user-provided image (e.g., a virtual market image) through image post-processing on the basis of a frame generated by an image-processing device and imaging position information corresponding to the frame, and providing a user with various services through the user-provided image.

The technical objectives of the present invention are not limited to the above, and other objectives may become apparent to those of ordinary skill in the art based on the following descriptions.

According to one aspect of the present invention, there is provided a method of determining imaging position information, the method including receiving, by a service server, information about a plurality of frames from an image-processing device, determining, by the service server, a plurality of pieces of imaging position information which each correspond to one of the plurality of frames, and generating, by the service server, a user-provided image through post-processing on the plurality of frames on the basis of the plurality of pieces of imaging position information.

According to another aspect of the present invention, there is provided a service server for determining imaging position information, the service server including a communicator configured to perform data communication with an image-processing device and a user device, and a processor operatively connected to the communicator, wherein the processor is configured to receive information about a plurality of frames from the image-processing device, determine a plurality of pieces of imaging position information which each correspond to one of the plurality of frames, and generate a user-provided image through post-processing on the plurality of frames on the basis of the plurality of pieces of imaging position information.

According to the present invention, imaging position information of at least one frame among a plurality of frames included in video information (e.g., omnidirectional image information) generated by an image-processing device is determined and imaging position information correspond to at least one frame.

Also, according to the present invention, a user-provided image (e.g., a virtual market image) is generated through image post-processing on the basis of a frame generated by an image-processing device and imaging position information corresponding to the frame and various services are provided to a user through the user-provided image

BRIEF DESCRIPTION OF THE DRAWINGS

FIG. 11 is a schematic view illustrating an omnidirectional image processing apparatus according to an exemplary embodiment of the present inventive concept.

FIG. 13 is a schematic view illustrating image capturing lines of a plurality of image capturing units according to an exemplary embodiment of the present inventive concept.

FIG. 14 is a schematic view illustrating image capturing lines of a plurality of image capturing units according to an exemplary embodiment of the present inventive concept.

DETAILED DESCRIPTION OF EXEMPLARY EMBODIMENTS

Figure 1:
FIG. 1 is a conceptual diagram illustrating an image-based service providing system according to an embodiment of the present invention.

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Hereinafter, an image-processing device according to an embodiment of the present invention may include an omnidirectional image-processing device. The omnidirectional image-processing device may include an omnidirectional camera (a 360-degree camera) capable of acquiring an omnidirectional image (or a 360-degree image).

In addition, hereinafter, image information and video information disclosed in the embodiment of the present invention may include an omnidirectional image (or a 360-degree image).

In addition, hereinafter, a product according to the embodiment of the present invention may refer to not only an article having a physical appearance but also a service product having no physical appearance.

Hereinafter, for the sake of convenience in description, the embodiment of the present invention is described under the assumption that an image-based service basically refers to a virtual market service and the image-processing device generates a store image. However, the image-based service may refer to various other services in addition to the virtual market service, and the image-processing device may generate various other images for providing an image-based service in addition to a store image, and the embodiment corresponding thereto is also included in the scope of the present invention.

FIG. 1 is a conceptual diagram illustrating an image-based service providing system according to an embodiment of the present invention.

In FIG. 1, the image-based service providing system for providing an image-based service on the basis of an image imaged by an image-processing device is disclosed.

The image-based service providing system may include an image-processing device 100, a service server 120, and a user device 140.

The image-processing device 100 may be implemented to generate an image for providing an image-based service. For example, the image-based service may be a virtual market service for providing a user with an image of a virtual market. The image-processing device 100 may be implemented to generate an image (e. g., an omnidirectional image) with respect to a product (or a store). For example, a product may be arranged on a display stand (or a shelf) for sale of product in an offline store. The image-processing device 100 may move through a movement route of the offline store, and generate an image with respect to a store and/or a product arranged in the store. The image of the store and/or the product arranged in the store generated by the image-processing device 100 may be expressed with the term "store image."

The image-processing device 100 may generate a virtual image with respect to the offline store without imaging the actual offline store. The virtual image with respect to the offline store may be an image generated by virtually setting a store, a display stand, a product, a movement route, and the like in a virtual space. Hereinafter, in the embodiment of the present invention, a store image may be used as a concept including a virtual image with respect to an offline store.

According to the embodiment of the present invention, imaging position information with respect to a frame generated by the image-processing device 100 may be matched with the frame. The image-processing device 100 may generate a plurality of frames per unit time, and imaging position information may be matched with a respective one of at least one frame among the plurality of frames. The matching between the frame and the imaging position information may be directly performed by the image-processing device 100 or may be performed by the service server 120. The matching between the frame and the imaging position information and the post-processing on the image generated by the image-processing device 100 will be described below.

The service server 120 may generate user-provided information for providing an image-based service to the user device 140 on the basis of the image received from the image-processing device 100.

The user-provided information may include a user-provided image and control information for a user's virtual movement and service providing in the user device 140. The user-provided image is an image generated by photographing an image using the image-processing device 100 and performing post-processing on the image and may represent an image for providing an image-based service by the user device 140.

For example, the service server 120 may generate user-provided information for purchasing a product using the user device 140 of the user through processing on a store image. The user-provided information may include a user-provided image and control information (e. g., movement control information and transaction control information) for a user's virtual movement and product purchase in the user device 140. The user-provided image may be an image with respect to a store that is generated on the basis of a store image and provided to the user device 140 and output.

The service server 120 may provide the user-provided image through image processing, such as excluding an overlapping or undesired part of an image received from the image-processing device 100 on the basis of the imaging position information corresponding to the frame, dividing store images by movement routes in the store, or the like. For example, the service server 120 may determine a user-provided image by excluding an image part overlapping in the store images generated by the image-processing device 100. Whether an image is an overlapping image may be determined on the basis of imaging position information corresponding to the frame.

In addition, the service server 120 may generate the user-provided image for each route by dividing the store images on the basis of each route in consideration of position information at which the store image is photographed. For example, when a route is divided into a first route and a second route at a branch point, a first route user-provided image for the first route may be generated on the basis of a first store image for the first route, and a second route user-provided image for the second route may be generated on the basis of a second store image for the second route.

In addition, the service server 120 may generate movement control information for virtual movement of the user in the user-provided image. For example, the service server 120 may generate movement control information for determining a branch point of a movement route in a store existing in a user-provided image and outputting a user interface (movement) at the branch point. The user interface (movement) may be implemented to determine a virtual movement direction of the user. In addition, the service server 120 may generate movement control information for matching input information received through the user interface (movement) at the branch point with the user-provided image.

The service server 120 may generate movement control information for displaying a user interface (movement) at the branch point in the store image, receiving user input information through the user interface (movement), and providing a user-provided image according to a user's virtual movement direction according to the user input information.

When it is determined that the user is located at a branch point through the image processing of the service server 120, a user interface (movement) may be output in a user-provided image output through the user device 140 on the basis of the movement control information. User input information for indicating a movement direction may be input through the user interface (movement). A user-provided image corresponding to the movement direction indicated by the user input information may be provided to the user device 140 on the basis of the movement control information. In this way, the user may indicate the movement direction and virtually move in the store through the user device 140.

In addition, the service server 120 may generate transaction control information for product information acquisition, product selection, and product transaction procedures of a user. For example, the service server 120 may extract a product image existing in a user-provided image as object information and determine a product corresponding to the product image. The service server 120 may generate transaction control information for matching product information about the determined product with the product image.

In addition, when a product is selected through a user interface (transaction), the service server 120 may generate transaction control information for providing additional product information and performing a transaction for the product. The user interface (transaction) may be implemented to select and trade a product in a user-provided image. The transaction control information may include information for selecting/trading a product such as the price of the product, the origin of the product, the transaction condition of the product, and the like. Product information matching with the product image in the user-provided image on the basis of the transaction control information is generated by the service server 120 and output as image information. In addition, when a product image is selected by the user through the user interface (transaction), additional product information about the product may be provided and a transaction procedure may be performed on the basis of the transaction control information generated by the service server 120.

In addition, the service server 120 may receive product transaction request information about a product selected by the user and may perform a product transaction procedure on the basis of the product transaction request information. For example, the user may request payment for a product purchased while virtually moving around the store through the user device 140. At the request, product transaction request information may be transmitted to the service server 120. The service server 120 may receive payment information (e.g., card information) for payment from the user device (or an additional user device) 140 and perform a payment procedure for the product. The payment procedure may be performed in association with a separate bank server. The product for which the transaction is completed by the service server 120 may be delivered to the user.

The service server 120 may provide the user-provided image to the user device 140 in a single step. Alternatively, the service server 120 may receive a request for a user-provided image from the user device 140 according to user input information input through a user interface and provide the requested user-provided image.

The service server 120 may include a communicator for data communication with the image-processing device 100 and the user device 140 and may include a processor operatively connected to the communicator. The operations of the service server 120 disclosed in the embodiment of the present invention may be performed on the basis of the processor.

The user device 140 may receive user-provided information from the service server 120 to provide an image-based service. For example, the user device 140 may be implemented for a product purchase of the user. The user device 140 may receive user-provided information from the service server 120 and output a user-provided image. In addition, user input information may be input through the user device 140, and on the basis of movement control information and transaction control information corresponding to the user input information, a virtual movement in the store is generated and a purchase procedure for a product may be performed.

For example, the user device 140 may receive user input information through a user interface (movement) and generate a user's virtual movement in the store in a user-provided image. In addition, the user device 140 may receive user input information through a user interface (transaction), and perform selecting of a product of the user, providing of information about the product, and purchasing of the product in the user-provided image.

For example, the user device 140 may be a device configured to output an omnidirectional virtual reality (VR)/augmented reality (AR) image and receive a hand movement as user input information. The user device 140 may be a head mounted display (HMD) and may receive a hand movement of a user that is interpreted as user input information.

In detail, the user may select a direction in which he or she desires to move through a user interface (movement) in a user-provided image provided through the user device 140 to virtually move on a virtual image provided by an image-based service. For example, the user-provided image may output a user interface (movement) at a branch point. An icon (or an image) included in the user interface (movement) for indicating a direction desired to move may be selected by the user's hand. The user device 140 may recognize the movement of the hand as user input information and provide the user with a user-provided image corresponding to a specific direction selected by the user on the basis of movement control information.

In addition, the user may select and purchase a product desired to be purchased through a user interface (transaction) in a user-provided image provided through the user device 140. For example, a product desired to be purchased in a user-provided image may be selected by the user's hand. In this case, the user device 140 may recognize the hand movement as user input information through the user interface (transaction) and provide the user with information (the price, the origin, and the like) about the selected product and perform product purchase processes on the basis of transaction control information.

That is, according to the embodiment of the present invention, the service server 120 may receive information about a plurality of frames from the image-processing device 100, determine a plurality of pieces of imaging position information for the respective frames, and perform post-processing on the plurality of frames on the basis of the plurality of pieces of imaging position information to thereby generate a user-provided image.

The determination of each of the plurality of pieces of imaging position information for a respective one of the plurality of frames by the service server 120 may refer to receiving, by the service server 120, the plurality of pieces of imaging position information and directly matching each piece of the plurality of pieces of imaging position information with a respective one of the plurality of frames or may refer to identifying a plurality of pieces of imaging position information, which are matched with a plurality of frames in advance by the image-processing device 100, for information processing.

In this case, each of the plurality of pieces of imaging position information may be information about an imaging position of a respective one of the plurality of frames. The plurality of frames may include all frames generated by the image-processing device 100 within a predetermined period of time or some frames of all the frames generated by the image-processing device 100 within the predetermined period of time. Each of the plurality of frames and a respective one of the plurality of pieces of imaging position information may be matched with each other on the basis of synchronized time information.

Figure 2:
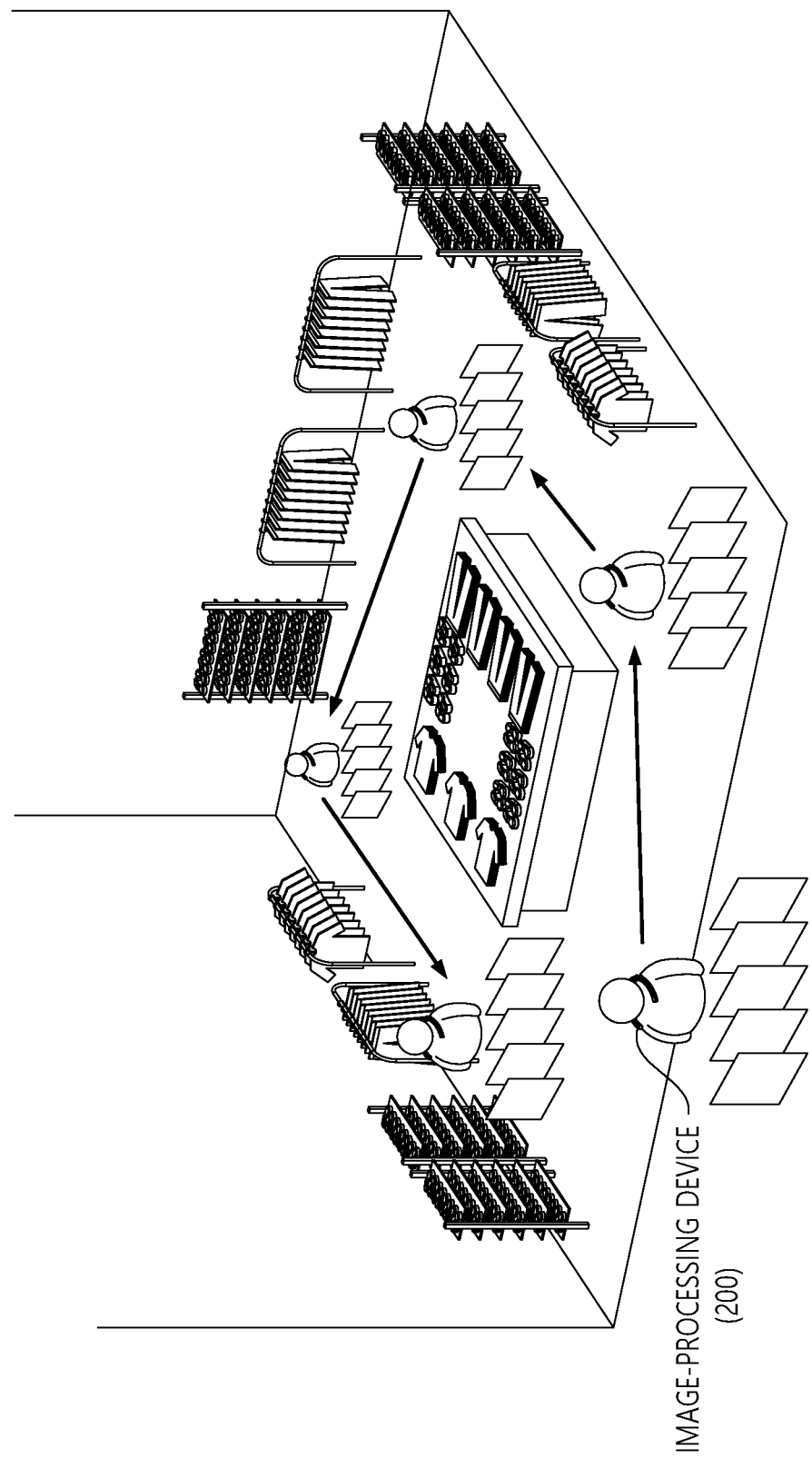
FIG. 2 is a conceptual diagram illustrating an image processing method performed by an image-processing device according to an embodiment of the present invention.

FIG. 2 is a conceptual diagram illustrating an image processing method performed by an image-processing device according to an embodiment of the present invention.

In FIG. 2, a method of determining pieces of position information corresponding to a plurality of frames (or pictures) included in image information (or video information, omnidirectional image information, and 360-degree image information) generated by the image-processing device 200 is disclosed.

The image-processing device 200 may generate image information by generating a plurality of frames in a specific time unit (for example, one second). For example, the image-processing device 200 may generate image information by photographing a plurality of frames within a predetermined time (for example, per second), for example, in a frame rate of 60 fps (frames per second), 30 fps, and 24 fps.

According to the embodiment of the present invention, imaging position information (or geo tag information) of the position at which a frame is imaged may be determined as information corresponding to at least one frame among the plurality of frames. That is, the imaging position information may be generated as information corresponding to all frames or preset frames generated by the image-processing device 200.

The image-processing device 200 may photograph an image indoors or outdoors. The image-processing device 200 (or a separate external device) may acquire imaging position information indoors or outdoors, and the acquired imaging position information may correspond to at least one frame among a plurality of frames constituting an image.

The imaging position information may be included in a transmission unit (or transmission format) of image information (a video bitstream) as parameter information about a frame and may be processed by the service server. The imaging position information may be included as parameter information of a frame and may be transmitted on image information including information about the frame. In detail, a first information unit with respect to imaging position information and a second information unit including frame information may constitute a single video bitstream.

Alternatively, the imaging position information may be generated by a separate external device and immediately transmitted to the service server or may be combined with frame information transmitted from the image-processing device 200 in the service server.

Alternatively, the imaging position information may be generated in an individual information format (or a transmission unit) separated from the image information. For example, imaging position information may be generated in a separate information format to correspond to frame imaging time information, and image information may include information about a frame and frame imaging time information corresponding to the frame. The imaging position information includes time information and imaging position information, and the image information includes time information and frame information, and the imaging position information and the frame information are matched with each other on the basis of synchronized time information, and the imaging position information, at which the frame is imaged, may be acquired.

Figure 3:
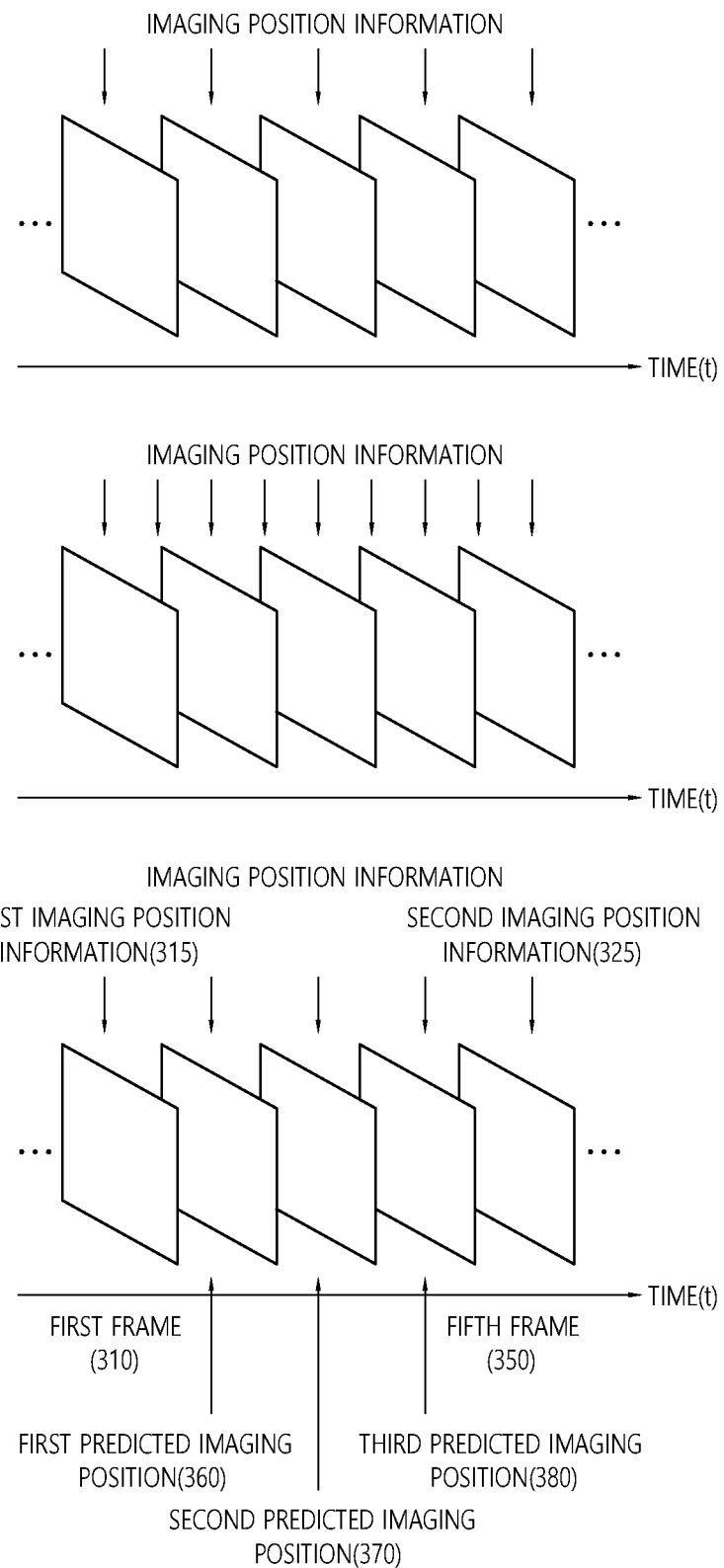
FIG. 3 is a conceptual diagram illustrating a frame group according to an embodiment of the present invention.

FIG. 3 is a conceptual diagram illustrating a frame group according to an embodiment of the present invention.

In FIG. 3, the frame group including a plurality of frames is disclosed. The frame group may be a set including a plurality of frames. In FIG. 3, it is assumed that imaging position information corresponding to each of the plurality of frames included in the frame group is generated.

Imaging position information corresponding to each of the plurality of frames included in the frame group may be generated. The imaging position information may be information about an imaging position at which the frame is imaged. The imaging position information may be generated by the image-processing device or may be generated by a separate external device.

Referring to the upper drawing of FIG. 3, imaging position information may be generated for each of the plurality of frames such that the number of pieces of imaging position information matches the number of frames per second (e.g., 30 fps) on the same time resource. For example, imaging position information is detected and generated at 30 intervals per second and each piece of imaging position information is matched with a corresponding one of a plurality of frames generated at 30 fps.

Referring to the middle drawing of FIG. 3, when the number of pieces of imaging position information is larger than the number of frames per second on the same time resource, some of the pieces of imaging position information are ignored, and imaging position information corresponding to a frame temporarily closest thereto may be determined to be the imaging position information of the frame. For example, when first imaging position information generated at $1/30^{th}$ of a second and second imaging position information generated at $1/25^{th}$ of a second exist, imaging position information for a frame generated at $1/30^{th}$ of a second may be the first imaging position information.

Referring to the lower drawing of FIG. 3, when the number of pieces of imaging position information is less than the number of frames per second on the same time resource, predicted imaging position information is determined on the basis of the imaging position information, and the predicted imaging position information may be determined as the imaging position information of a frame.

For example, imaging position information received at a time of imaging a first frame 310 may be first imaging position information 315, and imaging position information received at a time of imaging a fifth frame 350 may be second imaging position information 325.

Imaging position information of a second frame, a third frame, and a fourth frame imaged between the first frame 310 and the fifth frame 350 may be determined as the first imaging position information 315, or may be determined on the basis of the first imaging position information 315 and the second imaging position information 325. By linearly connecting a first position indicated by the first imaging position information 315 to a second position indicated by the second imaging position information 325 or considering route information on a map, a user movement route may be set.

The user movement route between the first position and the second position may be divided into a first predicted imaging position 360, a second predicted imaging position 370, and a third predicted imaging position 380 that are then determined to be respective pieces of imaging position information of the first second, the third frame, and the fourth frame. For example, the user movement route between the first position and the second position is divided at equal intervals such that the first predicted imaging position 360, the second predicted imaging position 370, and the third predicted imaging position 380 are determined. The user movement route between the first position and the second position may not be equally divided in consideration of the moving speed of the image-processing device.

The determined first predicted imaging position 360 may be determined to be the imaging position information of the second frame, the second predicted imaging position 370 may be determined to be the imaging position information of the third frame, and the third predicted imaging position 380 may be determined to be the imaging position information of the fourth frame.

The service server may receive the imaging position information and the frame information and generate the user-provided image on the basis of the imaging position information and the frame information.

Figure 4:
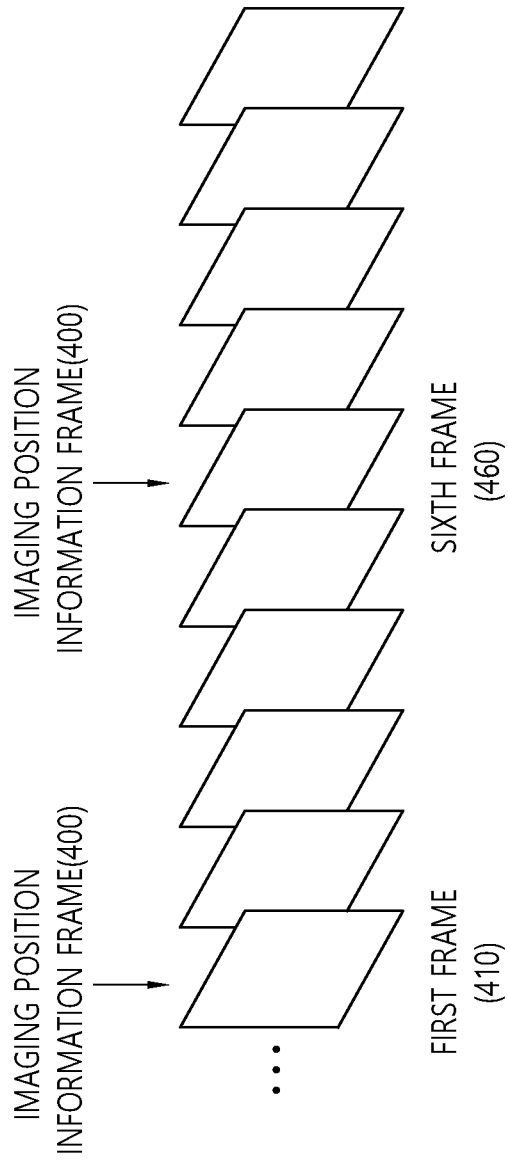
FIG. 4 is a conceptual diagram illustrating a frame group according to an embodiment of the present invention.

FIG. 4 is a conceptual diagram illustrating a frame group according to an embodiment of the present invention.

In FIG. 4, a frame group including a plurality of frames is disclosed. The frame group may be a set including a plurality of frames. In FIG. 4, it is assumed that imaging position information corresponds to only some frames among the plurality of frames included in the frame group.

Referring to FIG. 4, when imaging position information corresponding to only some of the plurality of frames exists, a frame corresponding to the imaging position information may be referred to as an imaging position information frame 400.

For example, when the image-processing device operates at 30 fps and imaging position information is generated two times per second, two frames among thirty frames generated per second may become imaging position information frames 400, and the generated two pieces of imaging position information may match with the respective two imaging position information frames 400.

The imaging position information frame 400 among the plurality of frames may be indicated. The service server may acquire imaging position information on the basis of indication information about indicating the imaging position information frame 400 to thereby generate a user-provided image.

Alternatively, the image-processing device may set some of the plurality of frames included in the frame group as the imaging position information frame 400 in advance. For example, when a frame group includes ten frames, a first frame 410 and a sixth frame 460 among the ten frames (the first to the tenth frames) may be set as the imaging position information frames 400. The imaging position information frame 400 among the plurality of frames may be indicated. The service server may generate a user-provided image on the basis of imaging position information based on the indication about indicating the imaging position information frame 400, the imaging position information frame 400, and the remaining frames not matching with the imaging position information. In detail, in order to generate a user-provided image, an imaging position information frame is determined on the basis of imaging position information frame-related indication information, and image post-processing is performed on the basis of imaging position information corresponding to the imaging position information frame such that the user-provided image is generated.

Figure 5:
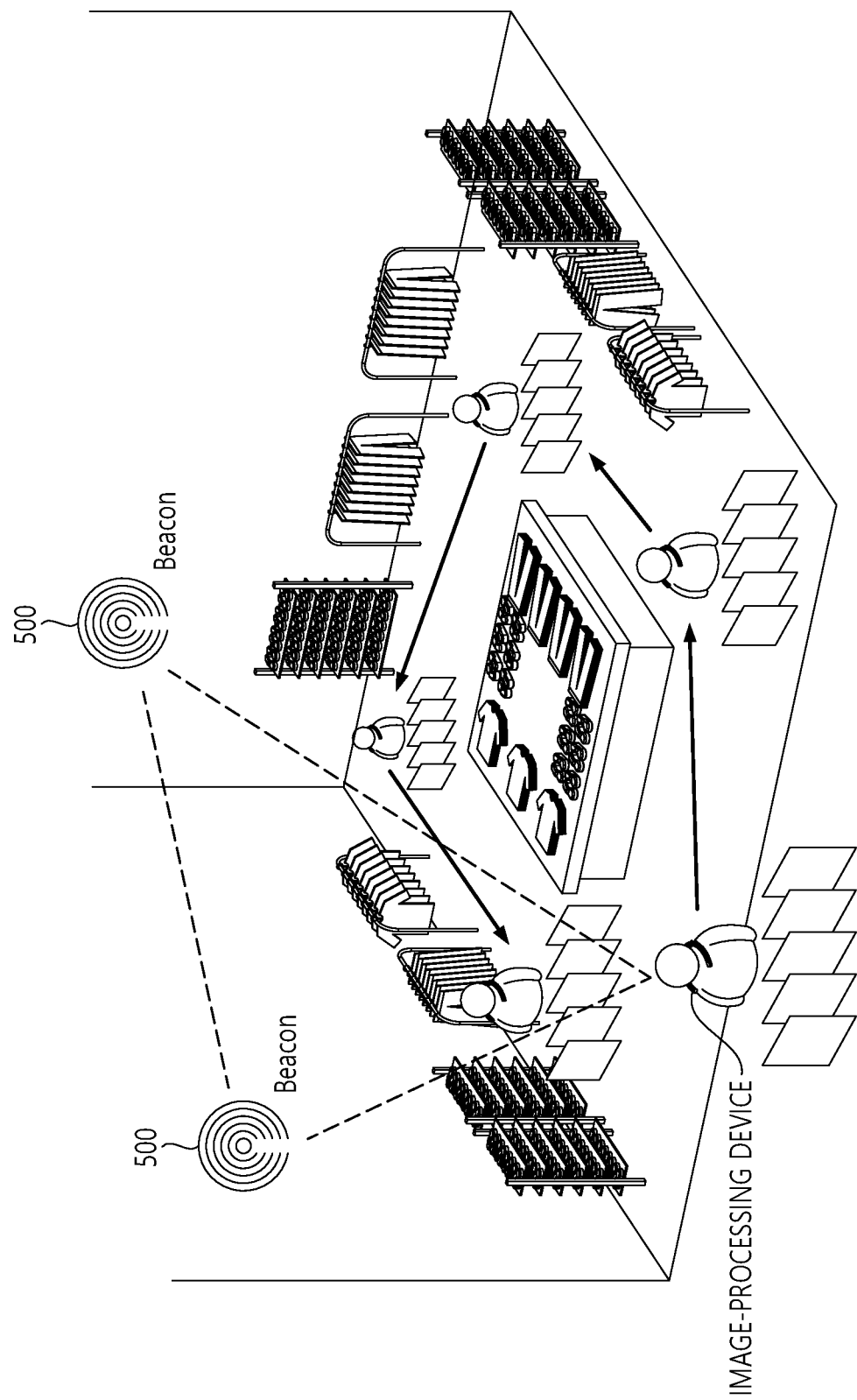
FIG. 5 is a conceptual diagram illustrating a method of determining imaging position information according to an embodiment of the present invention.

FIG. 5 is a conceptual diagram illustrating a method of determining imaging position information according to an embodiment of the present invention.

In FIG. 5, a method of determining imaging position information of an image-processing device for photographing an image indoors or outdoors is disclosed.

Referring to FIG. 5, when the image-processing device performs imaging indoors, imaging position information of the image-processing device may be determined on the basis of indoor positioning technology. For example, an imaging position of the image-processing device indoors may be determined on the basis of an indoor positioning technology using a communication signal. For example, the image-processing device may receive a positioning signal transmitted by a plurality of beacons 500 implemented indoors for positioning and determine a current imaging position of the image-processing device on the basis of the positioning signal.

In addition, when the image-processing device performs imaging outdoors, imaging position information of the image-processing device may be determined on the basis of outdoor positioning technology. For example, an imaging position of the image-processing device may be determined on the basis of a global positioning system (GPS), and the determined imaging position information may be mapped to a frame.

In detail, a GPS module implemented in the external device or the image-processing device may receive a GPS signal to acquire imaging position information, and the acquired imaging position information may be mapped with a frame imaged at the time of the acquisition.

Alternatively, according to embodiments of the present invention, imaging position information may be generated in consideration of movement information of the image-processing device.

Figure 6:
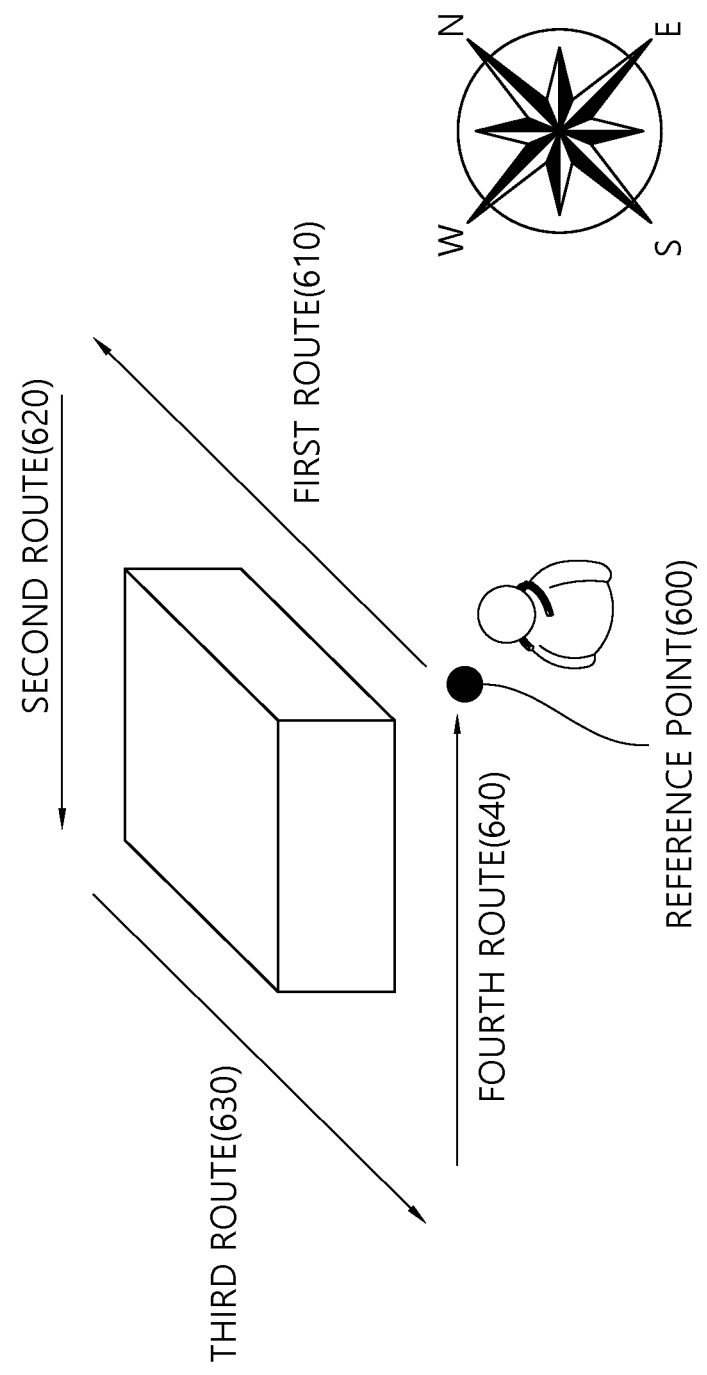
FIG. 6 is a conceptual diagram illustrating a method of generating imaging position information on the basis of movement information of an image-processing device according to an embodiment of the present invention.

FIG. 6 is a conceptual diagram illustrating a method of generating imaging position information on the basis of movement information of an image-processing device according to an embodiment of the present invention.

In FIG. 6, a method for generating imaging position information on the basis of a movement of an image-processing device is disclosed. The route shown in FIG. 6 is an example representing a movement of the image-processing device, and the image-processing device may perform imaging while moving along various routes indoors/outdoors.

Referring to FIG. 6, the image-processing device may photograph an image while moving preset routes (a first route 610 to a fourth route 640). Movement information of the image-processing device may be acquired on the basis of a reference point 600. The movement information may include information about the movement of the image-processing device, such as a movement distance by time, a total movement distance, a movement speed/movement direction, a movement time, and the like.

For the sake of convenience in description, the following description is made on the assumption that the movement information is acquired by the image-processing device, but the movement information may be acquired by other devices (e.g., a user device linked with the image-processing device) in addition to the image-processing device.

For example, when the image-processing device moves from the first route 610 to the fourth route 640, a starting point of the first route 610 may serve as a reference point 600. The image-processing device may perform imaging while moving from the first route 610 to the fourth route 640 in the following order.

1) The image-processing device may perform imaging in the first route 610 while moving northward on the first route 610. According to the movement of the image-processing device on the first route 610, movement information on the first route 610 may be acquired.

2) The image-processing device may switch to the second route 620 at the end of the first route 610 and perform imaging in the second route 620 while moving westward. According to the movement of the image-processing device on the second route 620, movement information on the second route 620 may be acquired.

3) The image-processing device may switch to the third route 630 at the end of the second route 620 and perform imaging in the third route 630 while moving southward. According to the movement of the image-processing device on the third route 630, movement information on the third route 630 may be acquired.

4) The image-processing device may switch to the fourth route 640 at the end of the third route 630 and perform imaging in the fourth route 640 while moving southward. According to the movement of the image-processing device on the fourth route 640, movement information on the fourth route 640 may be acquired.

A moving line of the image-processing device may be determined on the basis of the reference point 600, the movement information on the first route 610, the movement information on the second route 620, the movement information on the third route 630, and the movement information on the fourth route 640. The moving line of the image-processing device may be determined in three-dimensional coordinates using the reference point as the origin. In detail, a route advancing x meters northward on the basis of the reference point may be the first route 610, and a route advancing y meters westward after the northward advancement of x meters may be the second route 620. The moving line of the image-processing device may be determined on the basis of the reference point.

The movement information may determine not only the information about the moving line of the image-processing device but also the imaging position information of the image-processing device. The imaging position information may be matched with an image (or a frame) imaged by the image-processing device and may also be matched with a user interface (movement) to provide a user-provided image.

In detail, the service server may receive the movement information on the first route 610, the movement information on the second route 620, the movement information on the third route 630, and the movement information on the fourth route 640, and provide a user interface (movement) that allows the user to move from the first route 610 to the fourth route 640 in a user-provided image. In addition, the service server may generate a user-provided image by matching imaging position information determined on the basis of the movement information on the route with an imaged frame. The matching of the imaging position information determined on the basis of the movement information with the frame will be described below in detail.

Figure 7:
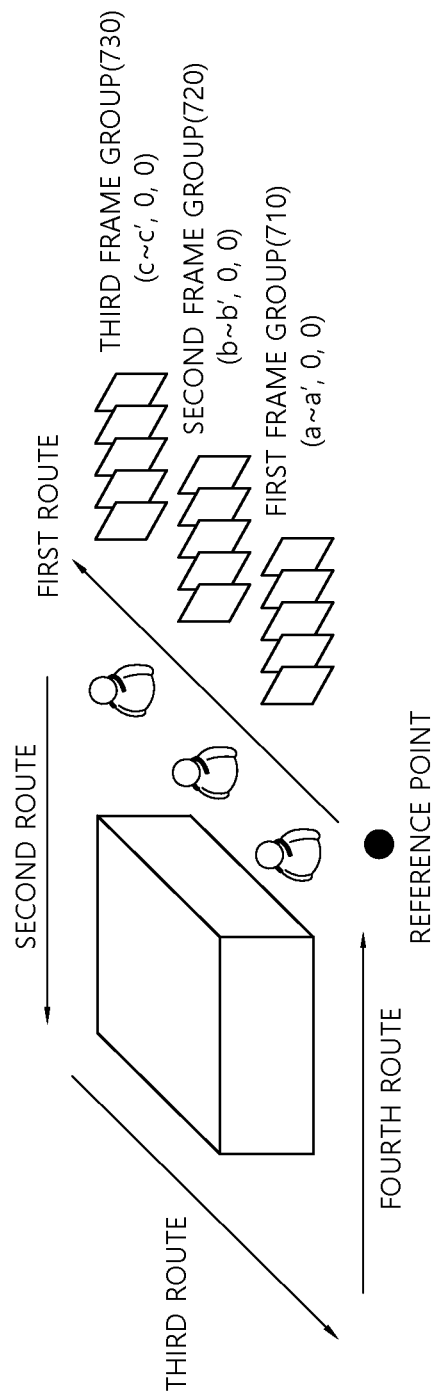
FIG. 7 is a conceptual diagram illustrating a method of generating a user-provided image according to an embodiment of the present invention.

FIG. 7 is a conceptual diagram illustrating a method of generating a user-provided image according to an embodiment of the present invention.

In FIG. 7, a matching method between imaging position information determined on the basis of movement information and a frame is disclosed.

Referring to FIG. 7, when movement information is determined as shown in FIG. 6, imaging position information may be determined on the basis of the movement information. That is, an imaging position of the image-processing device according to the time may be determined on the basis of the movement information.

As described above, the movement information may include information about a movement distance by time, a total movement distance, a movement speed/movement direction, and the like. Under the assumption that the reference point is the origin, the position of the image-processing device according to the time, that is, the imaging position information, which is information about the imaging position of the image processing apparatus according to the time, may be determined on the basis of the movement information.

On the basis of the reference point (0, 0, 0), the image-processing device may be located at a position (a~a', 0, 0) between zero seconds and one second, at a position (b~b', 0, 0) between one second and two seconds, and at a position (c~c', 0, 0) between two seconds and three seconds, and such information about the position of the image-processing device may be determined as the imaging position information. For the sake of convenience in description, the above description is made with the time unit set in seconds, but the imaging position information may be determined on the basis of various units of time other than seconds.

When imaging is performed at 30 fps by the image-processing device, a first frame group 710 including thirty frames imaged between zero seconds and one second corresponds to the imaging position information (a~a', 0, 0), a second frame group 720 including thirty frames imaged between one second and two seconds corresponds to the imaging position information (b~b', 0, 0), and a third frame group 730 including thirty frames imaged between two seconds to three seconds corresponds to the imaging position information (c~c', 0, 0).

The image-processing device may generate time-specific frame information by performing imaging according to the moving time. A set (time, imaging position information) may be matched with a set (time, frame information) on the basis of synchronized time information such that the imaging position information is matched with the frame information. The service server may generate a user-provided image by matching the imaging position information with the frame information on the basis of the synchronized time information.

Figure 8:
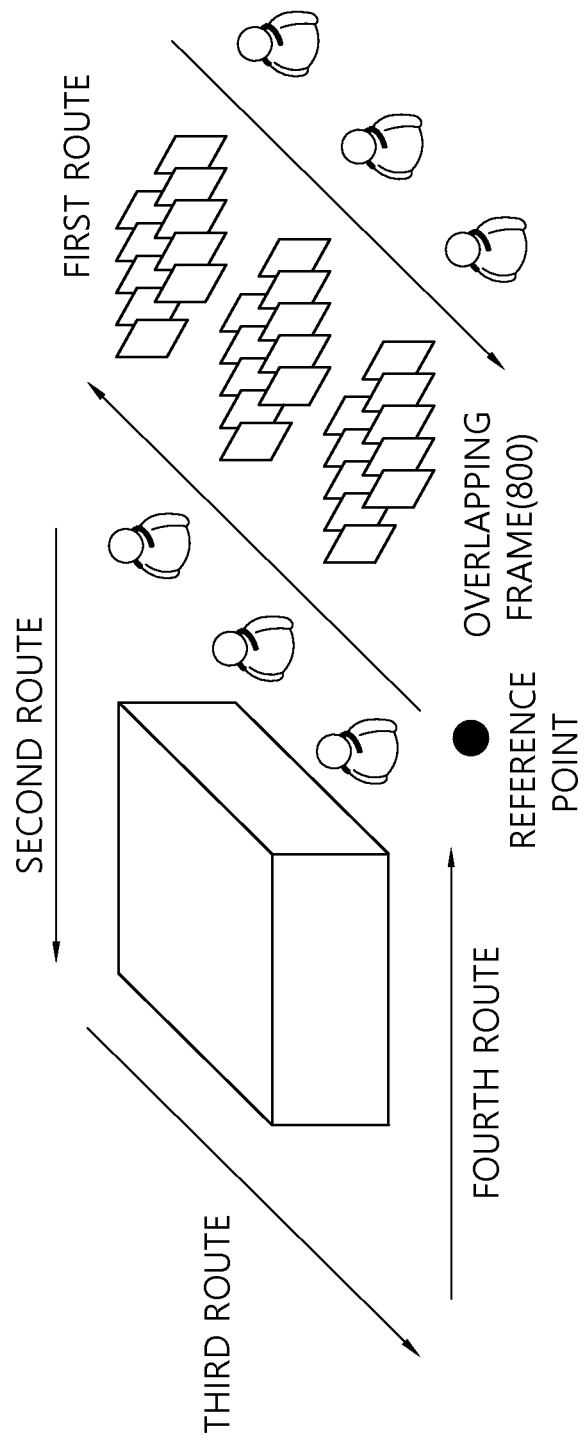
FIG. 8 is a conceptual diagram illustrating a method of generating a user-provided image according to an embodiment of the present invention.

FIG. 8 is a conceptual diagram illustrating a method of generating a user-provided image according to an embodiment of the present invention.

In FIG. 8, a method of generating a user-provided image by removing an overlapping imaging area is disclosed.

Referring to FIG. 8, pieces of movement information of the image-processing device may be consecutively generated on the basis of a reference point, and a movement route of the image-processing device may be identified on the basis of the movement information. Alternatively, the movement route of the image-processing device may also be identified by the outdoor positioning method/indoor positioning method.

Inside the store, movement routes of the image-processing device may overlap each other, and when the movement routes overlap each other, frames imaged by the image-processing device may also overlap each other. The service server may generate a user-provided image by processing the overlapping frames 800 in consideration of the movement information.

First, the service server may extract an overlapping movement route on the basis of the imaging position information. The service server may determine a frame imaged on the overlapping movement route as an overlapping frame 800 in which the same area is imaged.

The service server may remove an undesired frame among the overlapping frames 800.

For example, when the image-processing device moves a first route twice, the service server may generate a user-provided image by leaving only a first frame group imaged in the first movement on the first route and removing a second frame group imaged in the second movement on the first route. Alternatively, the service server may generate a user-provided image by leaving a frame group in which the imaging of an object is more clearly performed between the first frame group and the second frame group or may generate a user-provided image by combining the first frame group and the second frame group and removing undesired frames.

In addition, the service server may generate a user-provided image by processing an undesired frame among imaged frames even when movement routes do not overlap.

Figure 9:
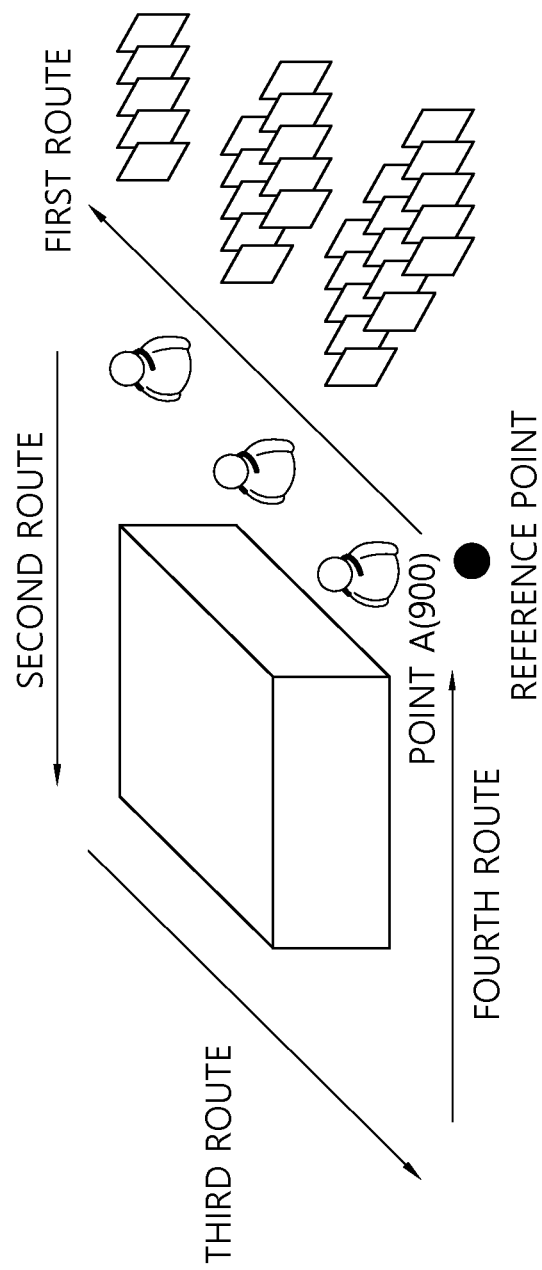
FIG. 9 is a conceptual diagram illustrating a method of generating a user-provided image according to an embodiment of the present invention.

FIG. 9 is a conceptual diagram illustrating a method of generating a user-provided image according to an embodiment of the present invention.

In FIG. 9, a method of generating a user-provided image by removing an undesired frame is disclosed.

Referring to FIG. 9, a user-provided image may be generated by removing an undesired frame among frames imaged by the image-processing device.

The image-processing device may stay at a specific place for varying lengths of time. For example, when the image-processing device stops at point A 900 and stays for 2 seconds, frames in which the same object is imaged for 2 seconds may be generated.

In order to generate a user-provided image, an undesired frame needs to be removed among the frames imaged at the point A 900.

The service server may remove frames among the frames generated by the imaging at the point A 900 except for frames required to generate the user-provided image.

For example, when 120 frames are imaged for two seconds at the point A 900, 90 frames, excluding 30 frames among the 120 frames, may be determined to be undesired frames and removed by the service server.

Figure 10:
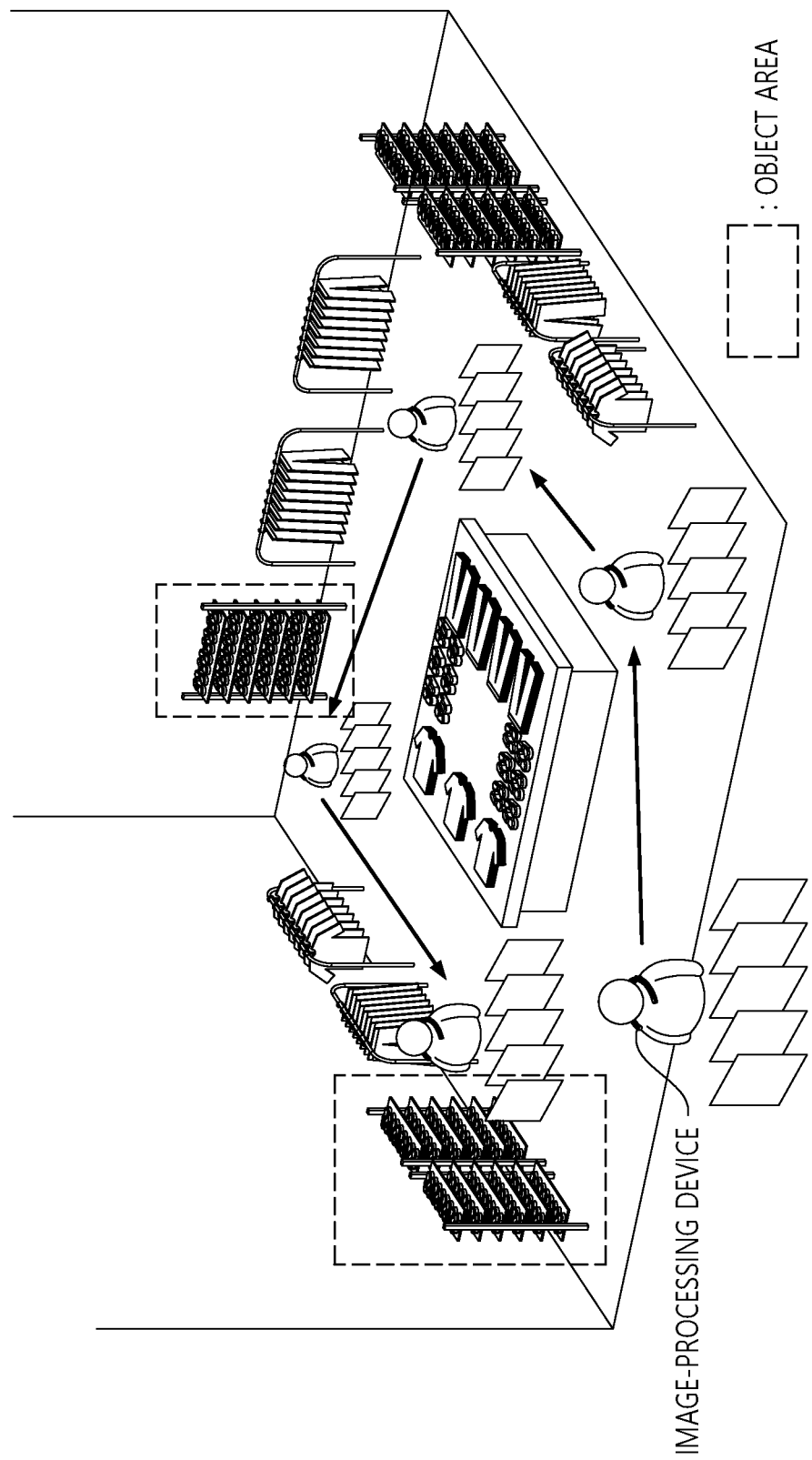
FIG. 10 is a conceptual diagram illustrating an object imaging method

FIG. 10 is a conceptual diagram illustrating an object imaging method by an image-processing device according to an embodiment of the present invention.

In FIG. 10, a method of imaging an object on the basis of a determination of a neighboring object using the image-processing device is disclosed.

Referring to FIG. 10, the service server may extract an object on the basis of object determination with respect to image information imaged by the image-processing device and acquire additional information through determination of the extracted object.

According to the embodiment of the present invention, the service server may extract an object in a user-provided image to determine information about the object and provide a user with a service on the basis of the object information through the user device. Alternatively, the service server may extract object-associated information (e.g., an object description text (or a card, a sign, or a notice), an object related quick response (QR) code, and the like) located adjacent to and associated with a respective one of individual objects in a user-provided image as object information of the respective object. The object-associated information extracted by the service server may be matched with product information through image analysis.

For example, the service server may extract image information related to a text such as "California oranges, XXXX won each" or to an orange associated QR code located around an orange as object-associated information. The object-associated information may be matched with an object (or an object image) located closest to the extraction position of the object-associated information.

Thereafter, the service server may determine a product corresponding to the object-associated information. The service server may match product information (the price, the origin, the sale status, and the like) of a specific product (e.g., an orange) corresponding to the object-associated information with the object-associated information (and/or the object information, the object association information), and provide the user with the product information of the specific product. For example, product information matched with object-associated information (or object image information) of a specific product (e.g., an orange) may be represented as image information and output in a user-provided image.

In order to provide such object information and object-associated information, the image-processing device needs to accurately photography an image of the object and the object-associated information. In order to image the object and the object association information, the image-processing device needs to perform the imaging by focusing on the object and the object-associated information in generating the image information.

The image-processing device may separate a background and an object for imaging the object and may perform imaging by focusing on the object.

Alternatively, the image-processing device may photograph images having different focuses at the same position. For example, the image-processing device may generate a plurality of pieces of image information having different focuses by changing the focal length from the smallest focal length to the infinite focal length at a specific position. The service server may generate a user-provided image by selecting image information in which the object information and the object-associated information have the highest clearness among the plurality of pieces of image information.

Hereinafter, in the embodiment of the present invention, an image-processing device used to generate a store image is exemplarily disclosed. The image-processing device disclosed below is merely an example, and various other types of image-processing devices may be employed to generate a store image.

FIG. 11 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 11.

Referring to FIG. 11, an omnidirectional image processing apparatus 1100 may have a wearable structure and may have a necklace-like shape that can be worn around the neck of a user. The omnidirectional image processing apparatus 1100 may be in the shape of an open necklace that is open on one side thereof, as illustrated in FIG. 11, or in the shape of a non-open necklace. In the description that follows, it is assumed that the omnidirectional image processing apparatus 1100 has a U shape that is open on one side thereof. The omnidirectional image processing apparatus 1100, which is U-shaped, may be worn around the neck of the user as a wearable device and may be able to capture an omnidirectional image.

For convenience, it is assumed that the omnidirectional image processing apparatus 1100 is worn around the neck of the user in the shape of a necklace (or in the shape of an open necklace that is open on one side thereof or in a U shape). However, the omnidirectional image processing apparatus 1100 may not necessarily be worn around the neck of the user. For example, the omnidirectional image processing apparatus 1100 may acquire an omnidirectional image by being hung on/attached to other parts of the body of the user or an external object.

The user can wear the omnidirectional image processing apparatus 1100 around his or her neck and can thus acquire a plurality of images for generating an omnidirectional image with both hands free.

The omnidirectional image processing apparatus 1100 may include a plurality of image capturing units. The plurality of image capturing units may be provided in the omnidirectional image processing apparatus 1100 to be a particular distance (or a predetermined distance) apart from one another and may independently capture images in accordance with a predetermined field of view/image capturing line. The locations of the plurality of image capturing units may be fixed in the omnidirectional image processing apparatus 1100, or the plurality of image capturing units may be movable so that their locations may vary.

For example, the omnidirectional image processing apparatus 1100 may include three image capturing units, and the three image capturing units may capture an omnidirectional image with a predetermined field of view (e.g., 1120 degrees to 180 degrees). The three image capturing units may be first, second, and third image capturing units 1110, 1120, and 1130.

For convenience, an omnidirectional image processing apparatus 1100 including three image capturing units will be described below. However, the omnidirectional image processing apparatus 1100 may be modified to include a plurality of image capturing units other than three (e.g., two, four, five, or six image capturing units) to capture an omnidirectional image, without departing from the spirit and scope of the present inventive concept.

The first, second, and third image capturing units 1110, 1120, and 1130 may capture an image in accordance with a predetermined field of view. At given time resources, a first image may be generated by the first image capturing unit 1110, a second image may be generated by the second image capturing unit 1120, and a third image may be generated by the third image capturing unit 1130. The first, second, and third image capturing units 1110, 1120, and 1130 may have a field of view of 120 degrees or greater, and there may exist overlapping areas between the first, second, and third images. Thereafter, an omnidirectional image may be generated by stitching together and/or correcting the first, second, and third images, which are captured at the given time resources by the omnidirectional image processing apparatus 1100. The stitching and/or the correcting of a plurality of images may be performed by the omnidirectional image processing apparatus or may be performed by a user device (such as a smartphone) that can communicate with the omnidirectional image processing apparatus 1100. That is, additional image processing for a plurality of images generated may be performed by the omnidirectional image processing apparatus 1100 and/or another image processing apparatus (such as a smartphone, a personal computer (PC), or the like).

The characteristics of the omnidirectional image processing apparatus and an omnidirectional image generation method will hereinafter be described.

Figure 12:
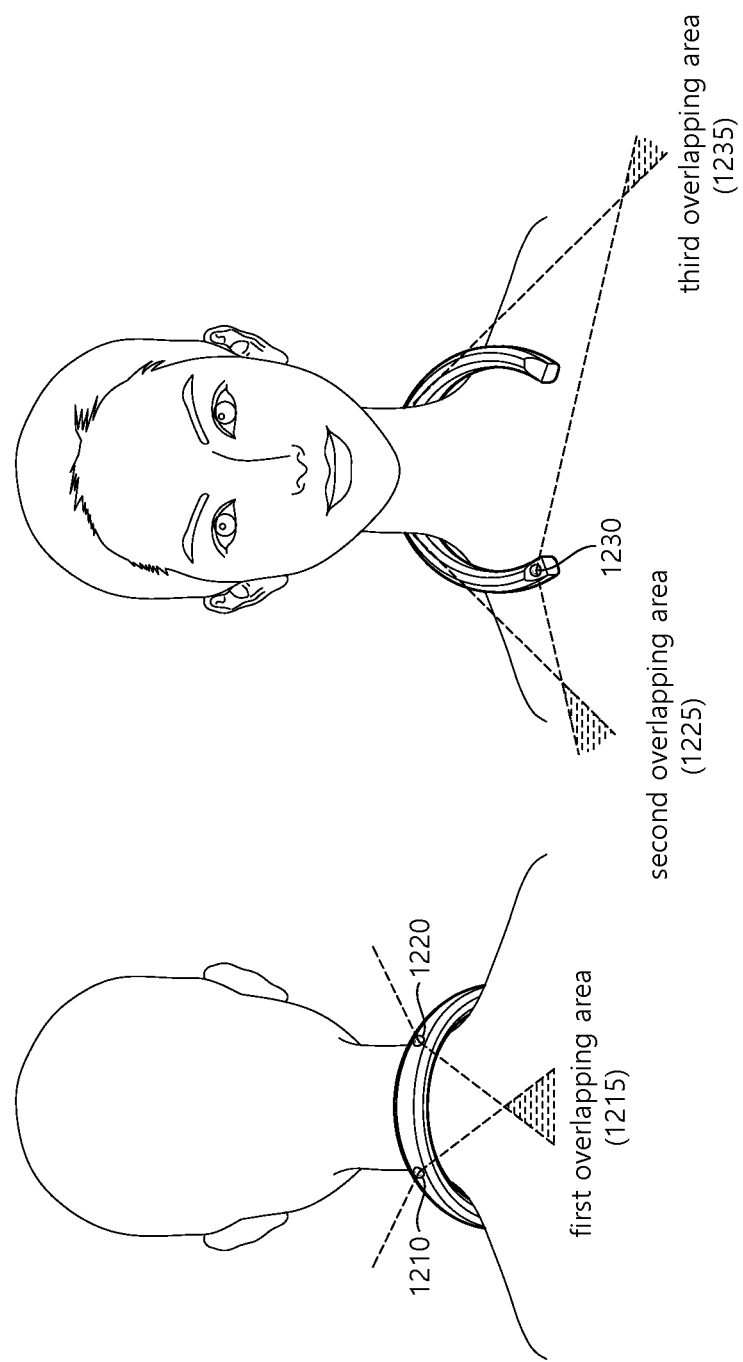
FIG. 12 is a schematic view showing the characteristics of a plurality of image capturing units provided in the omnidirectional image processing apparatus according to an exemplary embodiment of the present inventive concept.

FIG. 12 is a schematic view showing the characteristics of a plurality of image capturing units provided in the omnidirectional image processing apparatus according to an exemplary embodiment of the present inventive concept.

FIG. 12 shows the characteristics of a plurality of image capturing units provided in a U-shaped omnidirectional image processing apparatus. The locations of the plurality of image capturing units illustrated in FIG. 12 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 12.

First and second image capturing units 1210 and 1220, which are included in the omnidirectional image processing apparatus, may be located at a curved part of the omnidirectional image processing apparatus where curvature is present. Specifically, when a user wears the omnidirectional image processing apparatus around his or her neck as a wearable device, the first and second image capturing units 1210 and 1220 may be provided at the curved part of the omnidirectional image processing apparatus that is in contact with the back of the neck of the user. For example, the first and second image capturing units 1210 and 1220 may be a predetermined distance apart from a point on the U-shaped omnidirectional image processing apparatus with a maximum curvature (e.g., the middle part of the U-shaped omnidirectional image processing apparatus).

The first image capturing unit 1210 may capture an image of a region including a rear left blind spot with respect to the user's line of sight. The second image capturing unit 1220 may capture an image of a region including a rear right blind spot with respect to the user's line of sight. Specifically, the first image capturing unit 1210 may have a first field of view and may capture an image of a region corresponding to the first field of view. The second image capturing unit 1220 may have a second field of view and may capture an image of a region corresponding to the second field of view. For example, the first and second fields of view may be 120 degrees to 180 degrees.

When image capturing is performed by the first and second image capturing units 1210 and 1220, a first overlapping area 1215, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 12.

A third image capturing unit 1230 may be disposed at the front of the omnidirectional image processing apparatus. Specifically, the third image capturing unit 1230 may be disposed at an end portion of the omnidirectional image processing apparatus (i.e., at an end portion of the U-shaped omnidirectional image processing apparatus). When a user wears the omnidirectional image processing apparatus around his or her neck as a wearable device, the end portion of the U-shaped omnidirectional image processing apparatus may face forward (i.e., toward the direction of the user's line of sight). The omnidirectional image processing apparatus includes first and second end portions, and the third image capturing unit 1230 may be disposed at one of the first and second end portions.

The third image capturing unit 1230 may perform image capturing in the same direction as the user's line of sight to capture an image of a region corresponding to the user's line of sight.

Specifically, the third image capturing unit 1230 may have a third field of view and may capture an image of a region corresponding to the third field of view. For example, the third field of view may be 120 degrees to 180 degrees. When image capturing is performed by the third image capturing unit 1230, a second overlapping area 1225, which is the overlapping area of the first field of view of the first image capturing unit 1210 and the third field of view of the third image capturing unit 1230, may be generated. Also, when image capturing is performed by the third image capturing unit 1230, a third overlapping area 1235, which is the overlapping area of the second field of view of the second image capturing unit 1220 and the third field of view of the third image capturing unit 1230, may be generated.

Due to the structural characteristics of the omnidirectional image processing apparatus as a wearable device that can be worn around the neck of a user, the first and second image capturing units 1210 and 1220 may be positioned higher than the third image capturing unit 1230 on the basis of the ground. Also, the third image capturing unit 1230 may be disposed at only one end portion of the omnidirectional image processing apparatus.

In an existing omnidirectional image processing apparatus, a plurality of image capturing units may be configured to be disposed at the same height and a predetermined angle, but in the omnidirectional image processing apparatus according to an exemplary embodiment of the present inventive concept, a plurality of image capturing units may be configured to have different angles with respect to each other and to be disposed at different heights. Thus, the first, second, and third overlapping areas 1215, 1225, and 1235, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images each generated by the first, second, and third image capturing units 1210, 1220, and 1230 in consideration of the first, second, and third overlapping areas 1215, 1225, and 1235.

The first, second, and third fields of view may be set to be the same, or to differ from one another, without departing from the spirit and scope of the present inventive concept.

FIG. 13 is a schematic view illustrating image capturing lines of a plurality of image capturing units according to an exemplary embodiment of the present inventive concept.

FIG. 13 illustrates image capturing lines of a plurality of image capturing units installed in an omnidirectional image processing apparatus according to an exemplary embodiment of the present inventive concept. Assuming that the ground is parallel to the X-Z plane formed by the X axis and the Z axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 13, are exemplary for showing differences in properties (for example, in height and angle) between the image capturing lines of the plurality of image capturing units, resulting from the characteristics of a wearable device. Also, the image capturing lines of FIG. 13 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 13 illustrates image capturing lines of first and second image capturing units 1310 and 1320.

The first and second image capturing units 1310 and 1320 may be positioned relatively higher than a third image capturing unit 1330. Assuming that a user who wears the omnidirectional image capturing apparatus around is standing in a Y-axis direction, due to the structural characteristics of a wearable device that can be worn on the neck, a part of the omnidirectional image capturing apparatus with curvature (i.e., a curved/central part of a U shape) where the first and second image capturing units 1310 and 1320 are disposed may be relatively raised, and a leg part of the omnidirectional image capturing apparatus (i.e., an end part of the U shape) where the third image capturing unit 1330 is disposed may be relatively dropped.

For example, a first image capturing line 1315 of the first image capturing line 1310 may be parallel to the X-Z plane and may have a first angle, a second angle, and a third angle with respect to the X axis, the Y axis, and the Z axis, respectively, at a point "a" on the Y axis.

A second image capturing line 1325 of the second image capturing unit 1320 may be parallel to the X-Z plane and may have a fourth angle, a fifth angle, and a sixth angle with respect to the X axis, the Y axis, and the Z axis, respectively, at the point "a" on the Y axis.

Referring to the lower part of FIG. 13, a third image capturing line 1335 of the third image capturing unit 1330 may be parallel to the X-Z plane and may have a seventh angle, an eighth angle, and a ninth angle with respect to the X axis, the Y axis, and the Z axis, respectively, at a point "b" on the Y axis. Here, b may be a smaller value than a. The third image capturing line 1335 of the third image capturing unit 1330 may be parallel to the X-Z plane and may face forward like the user's line of sight (for example, toward a direction perpendicular to the X-Y plane).

That is, the first and second image capturing lines 1315 and 1325 may have the same height with respect to the Y axis, and the third image capturing line 1335 may be positioned relatively lower than the first and second image capturing lines with respect to the Y axis. The first, second, and third image capturing lines 315, 1325, and 1335 illustrated in FIG. 13 are exemplary image capturing lines having different properties, and various image capturing lines other than those set forth herein can be defined to capture an omnidirectional image.

FIG. 14 is a schematic view illustrating image capturing lines of a plurality of image capturing units according to an exemplary embodiment of the present inventive concept.

FIG. 14 illustrates image capturing lines of a plurality of image capturing units, which are different from those of FIG. 13. It is assumed that the ground is parallel to the X-Z plane formed by the X axis and the Z axis.

The upper part of FIG. 14 illustrates image capturing lines of first and second image capturing units 1410 and 1420.

The first and second image capturing units 1410 and 1420 may be positioned relatively higher than a third image capturing unit 1430. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 1410 and 1420 are disposed is relatively raised and a leg part of the omnidirectional image capturing apparatus (i.e., an end part of the U shape) where the third image capturing unit 1430 is disposed is relatively dropped.

For example, a first image capturing line 1415 of the first image capturing line 1410 may be parallel to the X-Z plane and may have a first angle, a second angle, and a third angle with respect to the X axis, the Y axis, and the Z axis, respectively, at a point "a" on the Y axis.

A second image capturing line 1415 of the second image capturing unit 1420 may be parallel to the X-Z plane and may have a fourth angle, a fifth angle, and a sixth angle with respect to the X axis, the Y axis, and the Z axis at the point "a" on the Y axis.

The lower part of FIG. 14 illustrates an image capturing line of the third image capturing unit 1430.

A third image capturing line 1435 of the third image capturing unit 1430 may be parallel to the X-Z plane and may have a seventh angle, an eighth angle, and a ninth angle with respect to the X axis, the Y axis, and the Z axis, respectively, at a point "b" on the Y axis.

Since the third image capturing unit 1430 is disposed at an end portion of the omnidirectional image processing apparatus, the third image capturing line may not be parallel to the X-Z plane and may have a predetermined angle (for example, 0 to 30 degrees) with respect to the X-Z plane.

That is, the first and second image capturing lines 1415 and 1425 may have the same height with respect to the Y axis, and the third image capturing line 1435 may be positioned relatively lower than the first and second image capturing lines 1415 and 1425 with respect to the Y axis. Also, the first and second image capturing lines 1415 and 1425 may be parallel to the X-Z plane, but the third image capturing line 1435 may not be parallel to the X-Z plane.

In another exemplary embodiment of the present inventive concept, the first image capturing line of the first image capturing unit may form a first' angle with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form the first' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a second' angle with respect to the X-Z plane and may have a seventh angle, an eighth angle, and a ninth angle with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form a second' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a third' angle with respect to the X-Z plane and may have a seventh angle, an eighth angle, and a ninth angle with respect to the X axis, the Y axis, and the Z axis, respectively, starting from the point "b" on the Y axis.

That is, in the omnidirectional image processing apparatus according to an exemplary embodiment of the present inventive concept, the image capturing lines of a plurality of image capturing units may be positioned at different points on the Y axis and may have different angles with respect to the ground (or the X-Z plane) unlike in an image processing apparatus where the image capturing lines of a plurality of image capturing units have the same angle with respect to the ground at a given point on the Y axis.

The above-described embodiments of the present invention may be implemented in the form of program instructions executable by various computer elements and recorded in a computer-readable recording medium. The computer-readable recording medium may include program instructions, data files, data structures, etc. alone or in combination. The program instructions recorded on the computer-readable recording medium may be specially designed and configured for the present invention or known to and used by those of ordinary skill in the computer software field. Examples of the computer-readable recording medium include magnetic media, such as a hard disk, a floppy disk, and magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, specially configured to store and perform program instructions. Examples of the program instructions include not only machine language code produced by a compiler but also high-level language code that can be executed by a computer through an interpreter or the like. To perform the operations of the present invention, the hardware devices may be configured as one or more software modules, and vice versa.

While the present invention has been described above with reference to specific details, such as detailed elements, by way of limited embodiments and drawings, these are provided merely to aid the overall understanding of the present invention. The present invention is not limited to the embodiments, and various modifications and changes can be made thereto by those of ordinary skill in the technical field to which the present invention pertains.

Therefore, the spirit of the present invention should not be limited to the above-described embodiments, and the scope of the present invention should be regarded as encompassing not only the following claims but also their equivalents and variations.

What is claimed is:

1. A method of determining imaging position information, the method comprising:
   receiving, by a service server, information about a plurality of frames from an image-processing device;
   determining, by the service server, a plurality of pieces of imaging position information which each correspond to one of the plurality of frames; and
   generating, by the service server, a user-provided image through post-processing on the plurality of frames on the basis of the plurality of pieces of imaging position information,
   wherein the plurality of pieces of imaging position information is determined based on a number of the pieces of imaging position information and a number of the frames within a predetermined period of time,
   wherein in determining that the number of the pieces of imaging position information is larger than the number of the frames, imaging position information corresponding to a frame closest thereto is determined to be the imaging position information of the frame,
   wherein in determining that the number of the pieces of imaging position information is less than the number of the frames, a predicted imaging position information is determined on a basis of the imaging position information, and the predicted imaging position information is determined as the imaging position information of the frame.

2. The method of claim 1, wherein each of the plurality of pieces of imaging position information includes information about an imaging position of the one of the plurality of frames.

3. The method of claim 2, wherein the plurality of frames include all frames generated within a predetermined period of time by the image-processing device.

4. The method of claim 2, wherein the plurality of frames include some of frames generated within a predetermined period of time by the image-processing device.

5. The method of claim 2, wherein each of the plurality of frames is matched with one of the plurality of pieces of imaging position information on the basis of synchronized time information.

6. A service server for determining imaging position information, the service server comprising:
   a communicator configured to perform data communication with an image-processing device and a user device; and
   a processor operatively connected to the communicator, wherein the processor receives information about a plurality of frames from the image-processing device,
   determines a plurality of pieces of imaging position information which each correspond to one of the plurality of frames, and
   generates a user-provided image through post-processing on the plurality of frames on the basis of the plurality of pieces of imaging position information,
   wherein the plurality of pieces of imaging position information is determined based on a number of the pieces of imaging position information and a number of the frames within a redetermined period of time, wherein in determining that the number of the pieces of imaging position information is larger than the number of the frames, imaging position information corresponding to a frame closest thereto is determined to be the imaging position information of the frame, wherein in determining that the number of the pieces of imaging position information is less than the number of the frames, a predicted imaging position information is determined on a basis of the imaging position information, and the predicted imaging position information is determined as the imaging position information of the frame.

7. The service server of claim 6, wherein each of the plurality of pieces of imaging position information includes information about an imaging position of the one of the plurality of frames.

8. The service server of claim 7, wherein the plurality of frames include all frames generated within a predetermined period of time by the image-processing device.

9. The service server of claim 7, wherein the plurality of frames include some of frames generated within a predetermined period of time by the image-processing device.

10. The service server of claim 7, wherein each of the plurality of frames is matched with one of the plurality of pieces of imaging position information on the basis of synchronized time information.

11. The method of claim 1, wherein in determining that the number of the pieces of imaging position information is less than the number of the frames, the pieces of imaging position information are matched with some of the frames based on a time of generating the pieces of imaging position information and the frames, the others of the frames are matched with the predicted imaging position information, and the predicted imaging position information is determined by dividing a distance between imaging positions indicated from the pieces of imaging position information.

12. The method of claim 11, wherein the distance of the imaging positions is determined by connecting with a straight line or by a predetermined map information, and the distance is divided based on the number of the others of the frames.

13. The method of claim 1, wherein each of the pieces of imaging position information is determined with factors including movement information of the image-processing device acquired based on a reference point and the number of the frames within the predetermined period of time, the reference point is a starting point to determine the movement information, and the movement information includes at least one moving line of the image-processing device determined based on the reference point.

14. The method of claim 13, wherein the movement information includes a movement speed and a movement direction of the image-processing device.

* * * * *